(12) United States Patent
Nagata (10) Patent No.: US 11,481,695 B2
(45) Date of Patent: Oct. 25, 2022

(54) TRANSPORTATION DEVICE SHARING SYSTEM

(71) Applicant: Toyota Motor Engineering & Manufacturing North America, Inc., Plano, TX (US)

(72) Inventor: Katsumi Nagata, Foster City, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 632 days.

(21) Appl. No.: 16/440,019

(22) Filed: Jun. 13, 2019

(65) Prior Publication Data

US 2020/0394569 A1  Dec. 17, 2020

(51) Int. Cl.
| | |
|---|---|
| *G06Q 10/02* | (2012.01) |
| *G06Q 50/30* | (2012.01) |
| *B60L 53/30* | (2019.01) |
| *G08G 1/00* | (2006.01) |
| *G07C 5/00* | (2006.01) |
| *G08G 1/123* | (2006.01) |

(Continued)

(52) U.S. Cl.
CPC .............. *G06Q 10/02* (2013.01); *B60L 53/30* (2019.02); *B60L 53/62* (2019.02); *G06Q 50/30* (2013.01); *G07C 5/006* (2013.01); *G07C 5/008* (2013.01); *G07C 5/0808* (2013.01); *G07C 9/00571* (2013.01); *G07C 9/30* (2020.01); *G08G 1/123* (2013.01); *G08G 1/202* (2013.01)

(58) Field of Classification Search
CPC ........ G06Q 10/02; G06Q 50/30; B60L 53/30; B60L 53/62; B60L 53/53; B60L 53/57; B60L 53/66; B60L 53/68; B60L 2200/24; B60L 2240/622; G07C 5/006; G07C 5/008; G07C 5/0808; G07C 9/00571; G07C 9/30; G07C 9/00896; G08G 1/123; G08G 1/202; Y02T 10/72; Y02T 90/16; Y02T 10/70; Y02T 10/7072; Y02T 90/12; G07B 15/00; H04L 67/12; H04L 67/10; H04L 67/18; H04L 67/52

See application file for complete search history.

(56) References Cited

U.S. PATENT DOCUMENTS

| | | |
|---|---|---|
| 2010/0280700 A1 | 11/2010 | Morgal et al. |
| 2016/0031514 A1 | 2/2016 | Gerhardt et al. |

(Continued)

*Primary Examiner* — Nha T Nguyen
(74) *Attorney, Agent, or Firm* — Christopher G. Darrow; Darrow Mustafa PC (57) ABSTRACT

Systems and devices related to a transportation device sharing system including vehicles with integrated docking ports are disclosed. In one embodiment, a vehicle includes a docking system for a transportation device, including a docking port, adapted to receive the transportation device and secure the transportation device, a communication device to wirelessly transmit and receive data, one or more processors, and a memory communicably coupled to the one or more processors and storing a status module including instructions that when executed by the one or more processors cause the one or more processors to determine whether the transportation device is present in the docking port and cause the communication device to transmit location data indicating a location of the vehicle, and status data, indicating at least the presence or absence of the transportation device in the docking port, to an external receiver.

10 Claims, 3 Drawing Sheets

(51) Int. Cl.
  *G07C 5/08* (2006.01)
  *G07C 9/30* (2020.01)
  *G07C 9/00* (2020.01)
  *B60L 53/62* (2019.01)

(56) References Cited

U.S. PATENT DOCUMENTS

| | | |
|---|---|---|
| 2016/0311334 A1 | 10/2016 | Moravick et al. |
| 2018/0069416 A1 | 3/2018 | Brace et al. |
| 2018/0072178 A1 | 3/2018 | Williams |
| 2019/0135158 A1* | 5/2019 | Outoukian ................ B60P 3/07 |
| 2019/0329692 A1* | 10/2019 | Gaither .................. A61G 5/128 |
| 2020/0273262 A1* | 8/2020 | Dudar .................. G07C 5/0841 |

* cited by examiner

TRANSPORTATION DEVICE SHARING SYSTEM

TECHNICAL FIELD

The subject matter described herein relates, generally, to a transportation device sharing system, and more particularly, to a transportation device sharing system including vehicles with integrated docking ports.

BACKGROUND

Various transportation device sharing systems allow people to temporarily share the use of a transportation device, such as a bicycle, scooter, etc., to traverse a relatively short distance. These transportation devices are sometimes referred to as "last-mile vehicles", in reference to their use in transporting a user the last amount of distance between a mass transit station and a final destination. In some such sharing systems the user is permitted to leave the last-mile vehicle wherever the user finishes using it and someone else can take the vehicle and use it from there. In other sharing systems, for example, those that include the use of electric last-mile vehicles, the user is required to return the vehicle to a docking station for storage and charging.

Either type of sharing system burdens users with operational and access problems. In sharing systems that permit users to leave the vehicles anywhere, last-mile vehicles tend to congregate around general destination areas—e.g., office buildings, popular downtown areas, etc. The natural distribution flow leaves many starting point areas unserviced by the last-mile vehicles and workers are often employed to collect and redistribute the vehicles. In systems that require a return to docking stations, users are reluctant to use the last-mile vehicle when they are unsure of the availability of a docking station at or near their destination.

SUMMARY

The disclosed apparatuses, methods and systems relate to new type of last-mile vehicle sharing system that incorporates other vehicles with integrated docking stations. The other vehicles can include, for example, cars, trucks, buses or the like. By deploying mobile docking stations in this manner the distribution of the stations can be more fluid, widespread and have a greater chance at naturally reaching obscure locations that in conventional stationary docking stations.

In one embodiment, a vehicle includes a docking system for a transportation device, including a docking port, adapted to receive the transportation device and secure the transportation device, a communication device to wirelessly transmit and receive data, one or more processors, and a memory communicably coupled to the one or more processors and storing a status module including instructions that when executed by the one or more processors cause the one or more processors to determine whether the transportation device is present in the docking port and cause the communication device to transmit location data indicting a location of the vehicle, and status data, indicating at least the presence or absence of the transportation device in the docking port, to an external receiver.

In another embodiment a transportation device sharing system includes a plurality of vehicles each having an integrated docking port that can be occupied by a transportation device, and a server to communicate with the plurality of vehicles and receive location data and inventory data from the plurality of vehicles and, in response to a request from a user, transmit the location data and the inventory data to the user, wherein the location data indicates a location of at least one of the plurality of vehicles, and the inventory data indicate whether the integrated docking port corresponding with the at least one of the plurality of vehicles is occupied or empty.

In another embodiment, a method of managing a transportation device system includes receiving a request for a transportation device based on a user location, transmitting a response to the request, the response including a pickup location and charge level for at least one available transportation device docked in a docking port integrated with a vehicle, receiving a selection of the at least one available transportation device, transmitting an access code in response to the selection, where the access code permits the user to obtain the at least one transportation device, receiving a return request for the at least one transportation device, transmitting, in response to the return request, a location of an unoccupied docking port integrated with a vehicle, and receiving the at least one transportation device at the unoccupied docking port.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with a transportation device (e.g., last-mile vehicles) sharing system including a plurality of transportation devices available for use (e.g., rental) and a plurality of vehicles with integrated docking ports that can hold the transportation devices are disclosed. Conventional docking stations for last-mile vehicles are stationary and are therefore not suited to respond to changes in locality demand flows. That is, as pockets of demand peak in different locations at different times across a given area, if no conventional docking station is present in the peak locations the demands remain unmet and potential users are forced to resort to other transportation modes.

The disclosed transportation device system takes advantage of the fact that many regions are populated with vehicles (e.g., automobiles, buses) regularly traversing the region and consequently active in many niche areas that are not near any conventional docking station. Accordingly, the disclosed transportation device sharing system can deploy multiple individually owned vehicles or existing vehicle networks (e.g., ride-sharing, bus routes, etc.) to implement distribution of a new type of docking station for rental/shared transportation devices. The distributor vehicles that are part of the disclosed transportation device sharing system include one or more integrated docking ports.

A "docking port" as used herein is a storage unit that can hold, and in some cases recharge, a rental transportation device. In implementation the docking port is installed upon or otherwise integrated in a participating distributor vehicle in a disposition that is accessible from the exterior of the distributor vehicle, thereby allowing a desiring member of the general public to retrieve a transportation device from the docking port without requiring access to the interior of the distributor vehicle itself. In this manner, rather than remaining in a fixed location and unresponsive to demand flows, the disclosed docking ports can be regularly mobile and transported to various niche areas in a region, thereby dramatically increasing the availability of both transportation devices for retrieval and empty docking ports for returns.

As mentioned above, the disclosed transportation device sharing system can be incorporated with existing transit systems, such as ride-sharing systems and bus routes. In these implementations a passenger can easily exit from one transportation system and directly transfer to another for the "last mile" of their trip. For example, a passenger on a bus can exit the bus, retrieve a scooter from an integrated docking port at the front of the bus, and proceed the remainder of their trip on the scooter. Upon arrival, as will be seen below, the disclosed transportation device sharing system provides a way to determine the location of a nearest empty docking port.

Due to the natural widespread and roaming nature of ridesharing systems, a user is much more likely to locate an empty docking port on a distributor vehicle in generally random places (e.g., at an idle ride-share distributor vehicle parked on the street), thereby making the return of the transportation device much easier. Additional features can further increase the feasibility and operational logistics of the disclosed transportation device sharing system, as will be discussed below.

Figure 1:
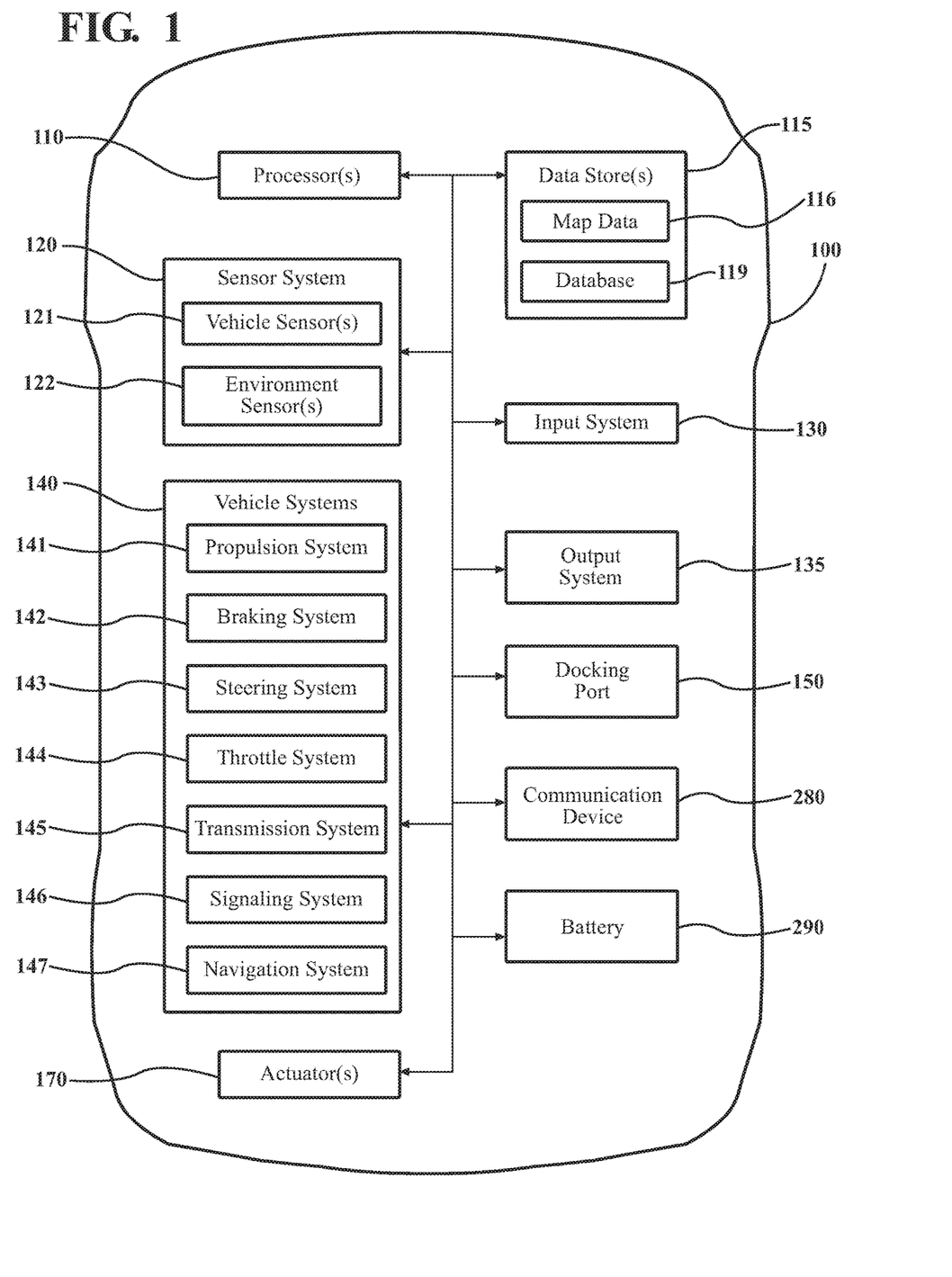
FIG. 1 illustrates one embodiment of a vehicle within which embodiments disclosed herein may be implemented.

Referring to FIG. 1, an example of a distributor vehicle 100 (hereinafter, vehicle 100) that can incorporate the disclosed integrated docking port is illustrated. As used herein, "vehicle" generally refers to any form of transport that is used for moving people, animals, goods, or the like. For example, in one or more implementations the vehicle 100 is an automobile. For simplicity, arrangements will be described herein generally with respect to automobiles. However, it should be understood that the scope of the disclosed subject matter is not limited to automobiles but can include buses and other types of vehicles.

As shown in FIG. 1, the vehicle 100 includes multiple elements. It should be understood that in various embodiments the vehicle 100 may not necessarily include all of the elements shown in FIG. 1. The vehicle 100 can have any combination of the various elements shown in FIG. 1. Further, the vehicle 100 can have other elements in addition to those shown in FIG. 1. In some arrangements, the vehicle 100 may be implemented without one or more of the elements shown in FIG. 1. While the various elements are shown as being located within the vehicle 100 in FIG. 1, it should be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2A, 3B, and 3 for purposes of brevity in this description. For simplicity and clarity of illustration, where appropriate, reference numerals have been repeated among the different figures to indicate corresponding or analogous elements. In addition, while the discussion outlines numerous specific details to provide a thorough understanding of the embodiments described herein, those of ordinary skill in the art will understand that the embodiments described herein may be practiced using various combinations of these elements.

In any case, the vehicle 100 includes an integrated docking port 150 that is implemented to perform methods and other functions as disclosed herein relating to providing access to a transportation device, aiding in tracking inventory and locations of transportation devices, charging and monitoring transportation devices, and other functions. The noted functions and methods will become more apparent in the following discussion of the figures.

Figure 2A:
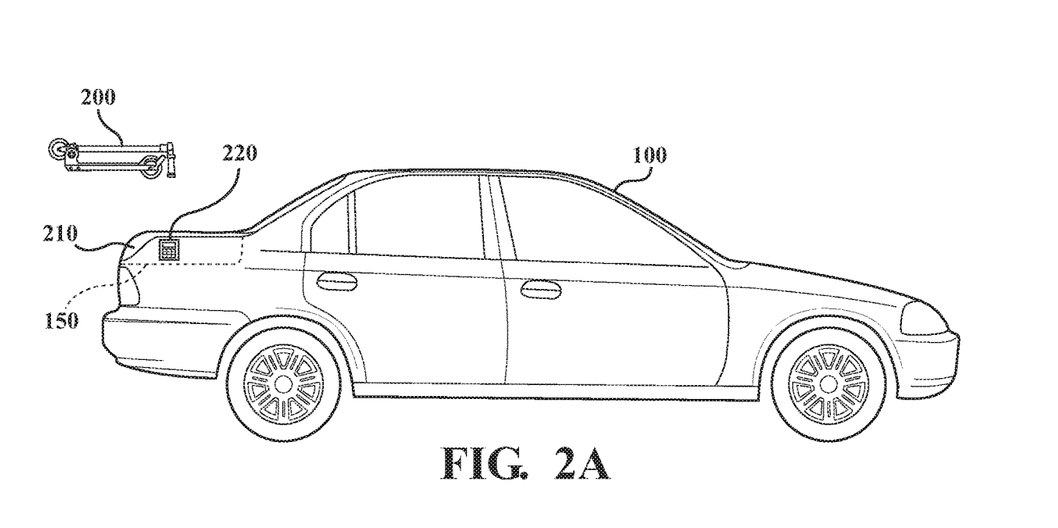
FIG. 2A illustrates one embodiment of a vehicle with an integrated docking port according to the disclosed subject matter.

FIG. 2A shows one implementation of the vehicle 100 of FIG. 1. The vehicle 100 includes an integrated docking port 150, configured to receive and store a transportation device 200, e.g., in the implementation illustrated, a foldable scooter. Although the docking port 150 is shown disposed on a rear side of the vehicle 100, the disclosed subject matter is not limited to this particular configuration. The docking port 150 can be removable or integrated on other parts of the vehicle 100 that are accessible from an exterior side of the vehicle 100, for example, on a top side (roof) of the vehicle 100, across the rear side width-wise, or other positions. Furthermore, although a single docking port 150 is depicted, the vehicle 100 may include more than one docking port 150.

The docking port 150 generally includes a securing mechanism 210 to secure the transportation device 200. In one or more embodiments, the securing mechanism 210 is implemented as a compartment door, configured to open or close to control access to a transportation device 200 stored within the docking port 150. However, in other embodiments the docking port 150 and securing mechanism 210 can be adapted for different types or sizes of transportation devices 200. For example, in implementations in which the transportation device 200 is a bicycle the docking port 150 can be implemented as a rack with the securing mechanism 210 implemented as a latch, lock, brace or other type of mechanism capable of securing the transportation device 200 to (or within) the docking port 150.

As shown in FIG. 2A, the docking port 150 can also include an input device 220 to receive input from a user who wishes to rent or otherwise obtain the transportation device 200. The input device 220 can include, for example, a card reader, chip reader, near-field communication (NFC) reader, wireless communication device, a touch screen, a keypad, coin slot, dollar feeder or other type of input device. Generally, the input device 220 can be configured in any of multiple ways to allow a user to complete a rental or check-out transaction in order to release the securing mechanism 210 and thereby obtain the transportation device 200.

The docking port 150 can be electronically and functionally integrated with the vehicle 100 as a part of a docking system. As will be seen below, the docking system can draw on the components in both the docking port 150 and the vehicle 100 to provide various features of the disclosed transportation device sharing system.

Figure 2B:
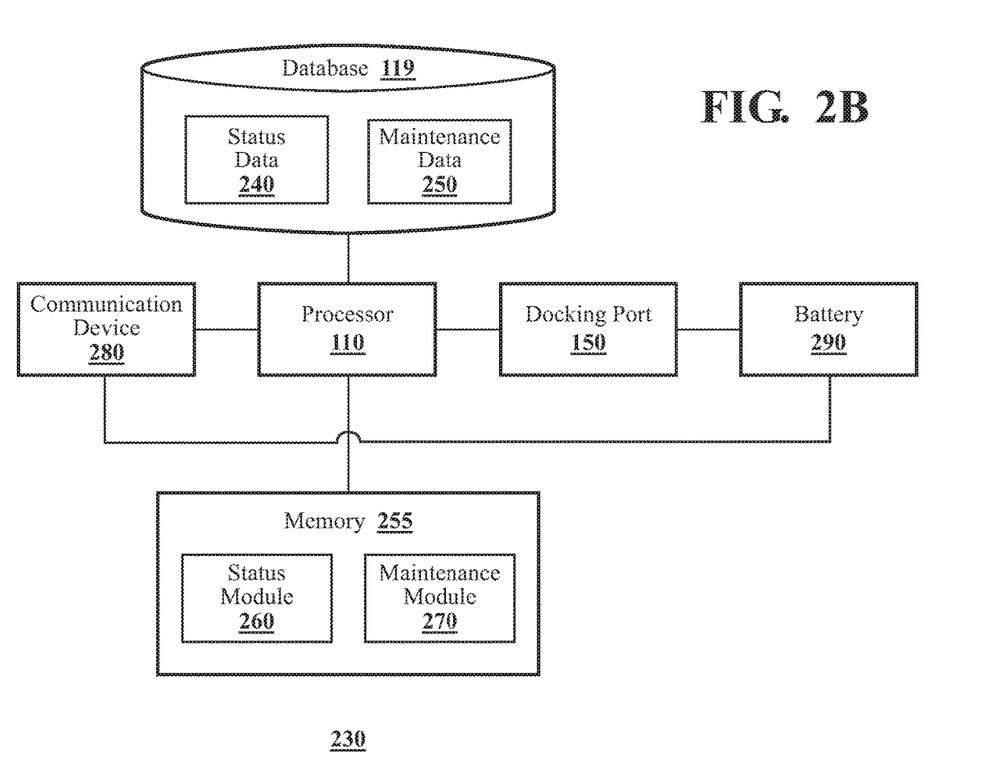
FIG. 2B illustrates one embodiment of a docking system according to the disclosed subject matter.

FIG. 2B shows a block diagram of one embodiment of a docking system 230 of the disclosed transportation device sharing system. It should be understood that the docking system 230 can include other components in addition to the components illustrated in FIG. 2B. As shown in FIG. 2B, in one embodiment the docking system 230 includes the docking port 150, a battery 290 (for example, the battery of vehicle 100) that is connected to the docking port 150 and can be used a source of power for recharging docked devices, a communication device 280, a memory 255 that stores modules 260 and 270, a processor 110 that executes instructions according to the modules 260 and 270, and a database 119 that stores status data 240 that indicate a status of the docking port 150 and maintenance data 250 that indicate a level of functionality of various components of a transportation device 200 stored in the docking port 150.

The battery 290 can be a vehicle battery, e.g., a car battery, or a separate battery that is charged separately and designated for use with the docking port 150.

The docking system 230 is shown including the processor 110 and the database 119 from the vehicle 100 of FIG. 1. Accordingly, the processor 110 may be a part of the docking system 230, the docking system 230 may include a processor separate from the processor 110 of the vehicle 100 or the docking system 230 may access the processor 110 through wireless communication with the vehicle 100 or another communication path. For example, in one or more embodiments the docking system 230 can communicate with various systems and electronic control units (ECUs) of the vehicle 100 via the communication device 280.

The communication device 280 can be implemented as a wireless communication system including a radio transceiver and other components necessary to operate in accordance with one or more wireless communication standards, for example, including but not limited to IEEE 802.11 and/or Bluetooth. The communication device 280, which may be a part of the docking system 230 or a part of the vehicle 100, is configured to wirelessly transmit data (e.g., inventory data, location data, charge data, etc.) to an external receiver, such as a system server, a cloud-based server or a mobile computing device.

The memory 255 is a random-access memory (RAM), read-only memory (ROM), a flash memory, or other suitable memory for storing the modules 260, 270. The modules 260, 270 can be constructed, for example, by computer-readable instructions that when executed by the processor 110 cause the processor 110 to perform the various functions disclosed herein.

The docking system 230 includes the database 119 which can store status data 240 and maintenance data 250, each of which will be described further below. The database 119 is, in one embodiment, constructed as an electronic data structure stored in the memory 255 or another data store, such as the vehicle 100 data store 115, a cloud-based storage, a removable memory device, or another suitable location that is accessible to the control module 270. The database 119 is configured with routines that can be executed by the processor 110 for analyzing stored data, providing stored data to internal and external systems, organizing/optimizing stored data, and so on. Thus, in one embodiment, the database 119 stores data described above (as well as other data) used by the control module 270 in executing various functions.

The status data 240 are in a data format that indicates a status of the docking port 150. The status can include inventory information and a charge state of the docking port 150, that is, for example, whether the docking port 150 is empty, or storing a fully charged transportation device 200, or storing and recharging a half-full charged transportation device 200, etc. The status data 240 can be time-stamped, thereby preserving a historical inventory flow of the vehicle 100. A review of the status data 240 can therefore determine how frequently a transactional event (i.e., removal or return) occurs at a given vehicle 100.

The status module 260 can update the status data 240 on a periodic basis and/or upon the occurrence of a transactional event. For example, in one scenario a user may approach the vehicle 100 at 8:15 AM, execute a rental transaction on the docking port 150 and remove a transportation device 200. The status module 260 can update the status data 240 to reflect this event and the date/time at which it occurred, and other information related to the event. For example, in one or more embodiments the status module 160 can also include a location of the vehicle 100 in the status data 240 updates. As will be discussed below, the vehicle sensors 121 (FIG. 1) can include a global positioning system (GPS) that can provide location data and/or coordinate data to the status module 160. Thus, the status data 240 updates can indicate both the time and the location of a retrieve/return transactional event, and more generally, the location of the docking port 150 and the vehicle 100.

Although in some implementations the transportation device 200 may be a manually powered last-mile vehicle, such as a bicycle, in other implementations the transportation device 200 may be a powered last-mile device, such as an electric scooter. For a transportation device 200 that requires charging, when the transportation device 200 is returned to the docking port 150, e.g., having a low battery charge, the status module 260 can update the status data 240 to reflect the return, then periodically update the status data 240 to indicate that the docking port 150 is charging the transportation device 200. As will be seen, keeping the status data 240 up to date can aid users of the disclosed transportation device sharing system in locating the vehicle 100 that carries a docking port 150 that meets the user's need.

In addition to the status module 260, which monitors the docking port 150, the maintenance module 270 can execute a diagnostics check on a transportation device 200 that is received by the docking port 150. The diagnostics check can be tailored to the type of transportation device 200 that is received. For example, for an electric scooter, the diagnostic check can include determining a battery capacity, current battery charge state, and tire pressure. The maintenance module 270 can store the results of the diagnostics check as maintenance data 250.

The docking system 230 can transmit the status data 240 and the maintenance data 250 to a central server or cloud-based server to allow the disclosed transportation device sharing system to track the inventory, location and status of transportation devices that are currently docked. The transportation device sharing system can provide users with access to this data, e.g., via a user interface such as a website or an application.

Figure 3:
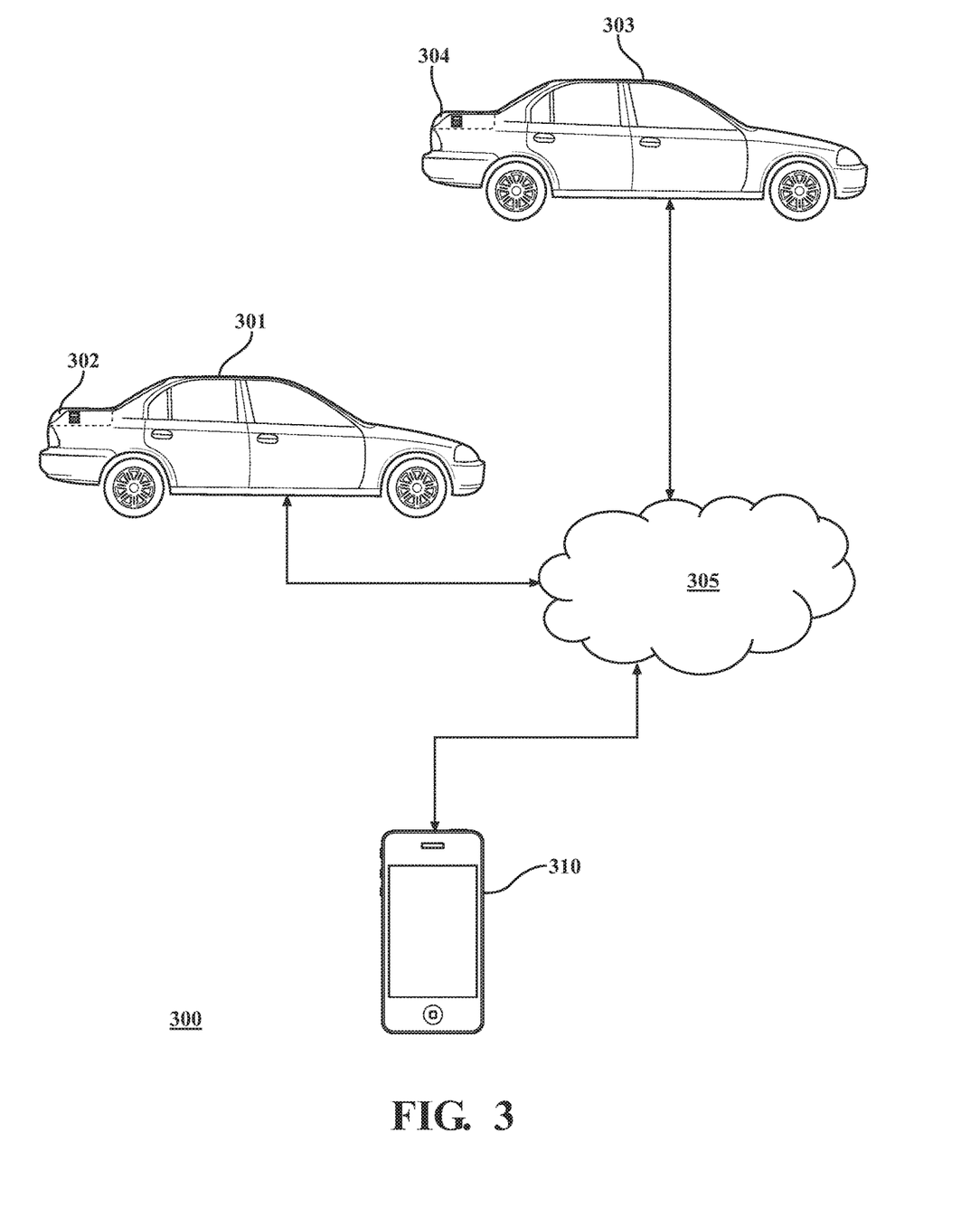
FIG. 3 illustrates an example implementation of a transportation device sharing system according to the disclosed subject matter.

FIG. 3 shows an example use case for the disclosed transportation device sharing system 300. As described above, the system 300 includes a plurality of distribution vehicles 301, 303, each having docking ports 302, 304, and an external receiver, i.e., a central system server 305 that tracks the inventory and the location of the docking ports 302, 304 and tracks maintenance status of transportation devices 200 within the system 300.

A user 310 desiring to obtain a transportation device 200 can use a computing device to send a request to the system server 305 for the location of the X nearest transportation devices 200. In one implementation, a user can enter the request into the app constructed to transmit the request information to the system server 305. The request can include a location and other information, such as identifying information of the user, a type of transportation device 200 that the user seeks, a preferred charge level, etc. The system server 305 can respond with the location and charge levels of one or more available transportation devices 200. For example, in one use case the system server 305 may determine, based on status data 240 updates, that the docking port 302 on the vehicle 301 holds a fully charged transportation device 200 and is currently the closest docking port to the user 310.

In one or more embodiments the user can select a transportation device 200 for the system server 305 to reserve. The system server 305 can respond with an access code or otherwise implement a type of key (e.g., associated with the user ID) that allows the user to retrieve the reserved transportation device 200 from a docking port, e.g., docking port 302.

In other embodiments, docking ports of the disclosed transportation device sharing system can be accessible without reservation but instead only require a user to input payment/identification information into a docking port to obtain access to the transportation device 200. In any case, as previously described, when a user retrieves a transportation device 200 from a docking port 150 the corresponding status module 260 can update the status data 240 and transmit the updated status data 240 to a server (e.g., the server 305) of the system for tracking purposes.

Continuing the use case of FIG. 3, when the user 310 has finished using the transportation device 200, the user 310 can send a return request to the system server 305, requesting the location of empty docking ports nearest to the user's 310 location for returning the transportation device 200. In response, for example, the system server 305 can determine that docking port 304 is unoccupied and is currently the closest unoccupied docking port to the user 310. The system server 305 can transmit the location of the unoccupied docking port 304 to the user 310. The user 310 can select the docking port 304 for return, and the system server 305 can notify the driver of vehicle 303 that a user 310 is en route to return a transportation device 200. The notification can be provided, for example, on an interface display of the vehicle 303 or in a text message to the driver, or the like. The user 310 can proceed to return the transportation device 200 to the docking port 304 and, in response, the status module 260 of the docking port 304 can update the status data 240 and the maintenance module 270 can initiate a diagnostics check of the returned transportation device 200 and update the maintenance data 250.

The server 305 can periodically request the maintenance data 250 from docking ports 302, 304, etc., for example, on a rolling schedule basis. If the maintenance data 250 indicates indicate any operational or function malfunctions have been detected, the server 305 can mark the corresponding transportation device 200 for removal from rotation for repairs and personnel can be sent to retrieve the transportation device 200 or a notification can be sent to the corresponding driver requesting delivery of the transportation device 200.

Thus, the disclose transportation device sharing system 300 can provide a highly improved distribution network for last-mile vehicles that increases the likelihood of supplying last-mile vehicles to niche areas and correspondingly increases the likelihood of providing return points in niche and remote areas. The integrated docking ports in personal vehicles, rideshare vehicles and public transit vehicles implement a natural flow that can inherently follow rises in proximal demand across a given area, for example, a city or town. Furthermore, the disclosed system provides an improved quality check by through the regular collection of maintenance data to ensure that faulty devices are addressed. These features lend to greater confidence and assurance to users of the disclosed transportation device sharing system that vehicles will be available, in good working order, and will be relatively easy to return to the appropriate port.

FIG. 1 will now be discussed in full detail as an example environment within which the system and methods disclosed herein may operate. As previously explained, the vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

As noted above, the vehicle 100 can include a sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100. In one or more embodiments, data from the vehicle sensor(s) can be used as supplemental data for the disclosed docking system 230, e.g., to augment the status data 240 with additional types of location data.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). In one or more embodiments, the input system 130 can receive inputs to adjust settings for the disclosed docking system 230, such as to indicate a docking port 150 is currently out of rotation, e.g., due to the driver of vehicle 100 intending to make the vehicle 100 inaccessible to the public for a period of time. The vehicle 100 can include an output system 135. An "output system" includes any device, component, or arrangement or groups thereof that enable information/data to be presented to a vehicle passenger (e.g., a person, a vehicle passenger, etc.). The output system 135 can include multiple displays, monitors, screens, etc., which may serve as a target for notifications from the disclosed docking system 230.

The vehicle 100 can include one or more vehicle systems 140. The vehicle systems 140 can be controlled by various ECU's, which can interact with the disclosed docking system 230, for example, in any of the ways discussed above. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110 and/or the docking system 230 can be operatively connected to communicate with the various vehicle systems 140 and/or individual components thereof. For example, returning to FIG. 1, the processor(s) 110 and/or the docking system 230 can be in communication to send and/or receive information to/from the various vehicle systems 140.

The vehicle 100 can include one or more actuators 170. The actuators 170 can be any element or combination of elements operable to modify, adjust and/or alter one or more of the vehicle systems 140 or components thereof to responsive to receiving signals or other inputs from the processor(s) 110. Any suitable actuator can be used. For instance, the one or more actuators 170 can include motors, pneumatic actuators, hydraulic pistons, relays, solenoids, and/or piezoelectric actuators, just to name a few possibilities.

As mentioned above, the vehicle 100 can include a battery 290 that can be used as a power source for the vehicle 100 and/or for the docking port 150, and can include a communication device 280 that can be used to communicate with an external computing system, external server, mobile computing device, or the like.

The vehicle 100 can include one or more modules, at least some of which are described herein. The modules can be constructed as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The block diagrams in the figures illustrate the architecture, functionality, and operation of possible implementations of systems, methods, and computer program products according to various embodiments. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Various aspects of the systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements of some of the components described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:
1. A vehicle including a docking system for a transportation device, comprising:
 a docking port configured to receive the transportation device and to secure the transportation device;
 a communication device configured to wirelessly transmit and receive data;

one or more processors; and
a memory communicably coupled to the one or more processors and storing:
a status module including instructions that when executed by the one or more processors cause the one or more processors to:
determine whether the transportation device is present in the docking port, and
cause the communication device to transmit:
location data indicating a location of the vehicle,
transactional data indicating both a time and a location of a retrieve transactional event and a return transactional event, and
status data indicating at least a presence or an absence of the transportation device in the docking port,
to an external receiver.

2. The vehicle of claim 1, wherein the docking port is electrically connected to a battery of the vehicle, adapted to draw power from the battery, and further adapted to recharge the transportation device using the power drawn from the battery.

3. The vehicle of claim 1, wherein the docking port is accessible from an exterior side of the vehicle.

4. The vehicle of claim 1, wherein the status module further includes instructions to determine a battery charge level of the transportation device and to include an indication of the battery charge level in the status data.

5. The vehicle of claim 1, wherein the external receiver is a cloud server that tracks locations and statuses of a plurality of vehicles.

6. The vehicle of claim 1, wherein the memory further stores a maintenance module including instructions that when executed by the one or more processors cause the one or more processors to execute a diagnostics check on the transportation device, generate a diagnostics report, and cause the communication device to transmit the diagnostics report to a central server.

7. The vehicle of claim 6, wherein the diagnostics report indicates a level of functionality of one or more of battery capacity, tire pressure, and current battery charge level of the transportation device.

8. A transportation device sharing system, comprising:
a plurality of vehicles, each having:
an integrated docking port configured to be occupied by a transportation device, and
a communication device configured to transmit transactional data indicating both a time and a location of a retrieve transactional event and a return transactional event; and
a server configured to:
communicate with the plurality of vehicles, and
receive location data and inventory data from the plurality of vehicles, and
in response to a request from a user, transmit the location data and the inventory data to the user, wherein:
the location data indicate a location of at least one of the plurality of vehicles, and
the inventory data indicate whether the integrated docking port corresponding with the at least one of the plurality of vehicles is occupied or empty.

9. The transportation device sharing system of claim 8, wherein:
one or more of the integrated docking ports are configured to recharge the one or more transportation devices while docked, and
the server is configured to communicate with the plurality of vehicles to receive status data indicating at least a charge level for the one or more transportation devices.

10. A method of managing a transportation device system, comprising:
receiving a request for a transportation device based on a user location;
transmitting a response to the request, the response including a pickup location and a charge level for at least one available transportation device docked in a docking port integrated with a vehicle;
receiving a selection of the at least one available transportation device;
transmitting an access code in response to the selection, wherein the access code permits a user to obtain the at least one transportation device;
receiving a return request for the at least one transportation device;
transmitting, in response to the return request, a location of an unoccupied docking port integrated with a vehicle; and
receiving the at least one transportation device at the unoccupied docking port.

* * * * *